United States Patent
Dzung et al.

(10) Patent No.: US 12,250,321 B2
(45) Date of Patent: Mar. 11, 2025

(54) METHOD FOR AUTHENTICATING MESSAGES IN RESOURCE LIMITED SYSTEMS

(71) Applicant: Hitachi Energy Ltd, Zürich (CH)

(72) Inventors: Dacfey Dzung, Wettingen (CH); Thanikesavan Sivanthi, Würenlingen (CH)

(73) Assignee: Hitachi Energy Ltd, Zürich (CH)

( * ) Notice: Subject to any disclaimer, the term of this patent is extended or adjusted under 35 U.S.C. 154(b) by 656 days.

(21) Appl. No.: 17/429,137

(22) PCT Filed: Feb. 5, 2020

(86) PCT No.: PCT/EP2020/052897
§ 371 (c)(1),
(2) Date: Aug. 6, 2021

(87) PCT Pub. No.: WO2020/161201
PCT Pub. Date: Aug. 13, 2020

(65) Prior Publication Data
US 2022/0094552 A1     Mar. 24, 2022

(30) Foreign Application Priority Data
Feb. 6, 2019   (EP) ..................... 19155836

(51) Int. Cl.
*H04L 9/32*   (2006.01)
*H04L 9/00*   (2022.01)

(52) U.S. Cl.
CPC ............. *H04L 9/3242* (2013.01); *H04L 9/50* (2022.05); *H04L 2209/30* (2013.01)

(58) Field of Classification Search
CPC . H04L 9/32; H04L 9/3242; H04L 9/50; H04L 63/08; H04L 63/12; H04L 63/123;
(Continued)

(56) References Cited

U.S. PATENT DOCUMENTS

| 5,673,318 A | 9/1997 | Bellare et al. |
| 7,426,636 B1 | 9/2008 | McGrew et al. |

(Continued)

FOREIGN PATENT DOCUMENTS

| EP | 1615370 A1 | 1/2006 |
| EP | 2541829 A1 | 1/2013 |

(Continued)

OTHER PUBLICATIONS

Saxena, Navrati, et al., "Efficient IoT Gateway over 5G Wireless: A New Design with Prototype and Implementation Results", Practical Perspectives on IoT in 5G Networks: Theory, Industrial Challenges, and Business Opportunities, IEEE Communications Magazine, Feb. 2017, pp. 97-105.

(Continued)

*Primary Examiner* — Shaqueal D Wade-Wright
(74) *Attorney, Agent, or Firm* — Slater Matsil, LLP

(57) ABSTRACT

The present invention provides a method for message authentication, in particular in case of low of transmission or storage capacities. The present invention further provides corresponding devices for generating or sending authenticated messages and for receiving or retrieving authenticated messages as well as a system comprising such devices. In an embodiment, the method may comprise (a) preparing a data block having an uncompressed length; (b) compressing the data block so that the data block has a compressed length smaller than the uncompressed length; (c) determining an available length from at least the compressed length and a maximum length of a data frame; (d) calculating a message authentication code, MAC, from at least the data block, having a MAC length not greater than the available length; and (e) creating the data frame, comprising the data block and the MAC.

22 Claims, 8 Drawing Sheets

(58) Field of Classification Search
CPC .. H04L 2209/30; H04W 12/10; H04W 12/106
See application file for complete search history.

(56) References Cited

U.S. PATENT DOCUMENTS

| | | | | |
|---|---|---|---|---|
| 7,725,927 | B2* | 5/2010 | Yang | G06F 21/305 |
| | | | | 726/5 |
| 9,667,634 | B2* | 5/2017 | Struik | H04L 63/105 |
| 2002/0174332 | A1 | 11/2002 | Vialen et al. | |
| 2007/0101412 | A1 | 5/2007 | Yang et al. | |
| 2009/0103820 | A1* | 4/2009 | Chang | H04N 19/115 |
| | | | | 382/237 |
| 2010/0208886 | A1 | 8/2010 | Boehl et al. | |
| 2013/0198509 | A1 | 8/2013 | Buruganahalli et al. | |
| 2015/0270968 | A1 | 9/2015 | Nairn et al. | |
| 2016/0099939 | A1* | 4/2016 | Jung | H04L 63/162 |
| | | | | 713/170 |
| 2017/0126409 | A1 | 5/2017 | Freudiger et al. | |
| 2017/0366354 | A1 | 12/2017 | Alomair | |
| 2018/0091308 | A1* | 3/2018 | Durham | G06F 3/0673 |
| 2018/0316504 | A1 | 11/2018 | Boehl et al. | |

FOREIGN PATENT DOCUMENTS

| | | |
|---|---|---|
| GB | 2459735 A | 11/2009 |
| JP | H06315027 A | 11/1994 |
| JP | 2016100632 A | 5/2016 |
| JP | 2018032903 A | 3/2018 |
| JP | 2019016987 A | 1/2019 |
| WO | 2015170452 A1 | 11/2015 |

OTHER PUBLICATIONS

Popovic, M., et al., "iPRP—The Parallel Redundancy Protocol for IP Netowrks: Protocol Design and Operation," IEEE Transactions on Industrial Informatics, vol. 12, No. 5, Oct. 2016, 13 pages.
Schneier, B., "Applied Cryptography, Second Edition: Protocols, Algorthms, and Source Code in Code in C (cloth)," John Wiley & Sons, Inc., Jan. 1, 1996, 1027 pages.

* cited by examiner

METHOD FOR AUTHENTICATING MESSAGES IN RESOURCE LIMITED SYSTEMS

CROSS-REFERENCE TO RELATED APPLICATIONS

This application is a national stage application of International Application No. PCT/EP2020/052897, filed on Feb. 5, 2020, which claims priority to European Patent Application No. 19155836.0, filed on Feb. 6, 2019, which applications are hereby incorporated herein by reference.

FIELD OF THE INVENTION

The present invention relates to the field of message authentication in resource limited systems.

BACKGROUND OF THE INVENTION

Devices for industrial automation, in particular for grid automation, as well Internet of Things, IoT, devices, such as IoT gateways, may transmit, receive, and store messages, in particular using insecure systems and networks. Further, storage and transmission capacities may be limited. In order to provide security against message faking or tampering and spoofing attacks, messages are authenticated. This can be achieved by a message authentication code, MAC, which can be an encrypted checksum or keyed hash of the message. E.g., a sender can calculate a MAC from the message via an algorithm, encrypt the MAC using an encryption key, and transmit the message and the MAC to a receiver; the receiver, knowing the encryption key and the algorithm, can itself calculate a MAC from the received message and can compare it with the received MAC. In case of a match, the message is authenticated. Message authentication may significantly increase the data size which can be problematic, in particular in case of limited capacities. For example, to prevent brute force attacks, a MAC must be long, e.g., 256 bits for the Secure Hash Algorithm SHA-256. In systems with limited communication or storage capacity 32 bytes represents a non-negligible overhead; for instance, low power long range wide area networks, LPWAN, are low rate wireless communication systems where typical packets carry payloads of only a few bytes.

US 2002/174332 A1 discloses a method of transmitting a message wherein, if the length of the message is shorter than the length of the block size, then the computed message authentication code is truncated to fit in the remaining space.

DESCRIPTION OF THE INVENTION

It is an objective of the present invention to provide a method for message authentication with increased security, in particular in case of low of transmission or storage capacities. Further objectives are to provide corresponding devices for generating or sending authenticated messages and for receiving or retrieving authenticated messages as well as a system comprising such devices. It can be seen as further objective to make additional space available in messages or data frames for placing a Message Authentication Code.

These objectives are achieved by creating or making use of additional space for message authentication by data compression and/or redundant message generation as disclosed by the subject-matter of the independent claims.

Further exemplary embodiments are evident from the dependent claims and the following description.

A first aspect of the present invention relates to a method, in particular a computer-implemented method, for message authentication. This method may comprise the following method elements which may be executed at a message source, a sender side, or a message generating side:

preparing, in particular by a preparation module, a data block, in particular an uncompressed data block, having an uncompressed length;

compressing, in particular subsequent to preparing the data block, in particular by a compression module, the data block so that the data block, in particular the compressed data block, has a compressed length smaller than the uncompressed length;

determining, in particular subsequent to compressing the data block, in particular by an authentication module, an available length from at least the compressed length and a maximum length of a data frame, wherein the maximum length may be a pre-determined, pre-defined or given maximum length;

calculating, in particular subsequent to determining the available length, in particular by the authentication module, a message authentication code, MAC, from at least the data block, in particular from at least the compressed data block, the MAC having a MAC length not greater than the available length, wherein an authentication key may be used; and creating, in particular subsequent to calculating the MAC, by a message generation module, the data frame, comprising, in particular in a pre-defined order or message format, the data block, in particular of the compressed length or the compressed data block, and the MAC.

Herein, the data block may be, in particular, compressed to create additional capacity for message authentication. In embodiments, the data frame may further comprise at least one data item, indicative of the compressed length and/or the MAC length.

In particular, the step of calculating the MAC from at least the data block may comprise calculating an additional MAC having an additional MAC length not greater than the available length and the method may further comprise the following method element which may be executed at the message generating or the sender side:

creating, in particular by the message generating module, an additional data frame, comprising, in particular in a pre-defined order or message format, the data block, in particular the data block of the compressed length or the compressed data block, and the additional MAC. The additional MAC may be different than the MAC. The additional data frame may further comprise at least one data item, indicative of the compressed length and/or the additional MAC length.

In particular in case of redundant message generation or transmission, the method elements of compressing and decompressing may be omitted. In this case, the compressed length and the uncompressed length coincide and may be used interchangeably and/or may be denoted as block length. In embodiments, the method of the first aspect of the invention comprises:

preparing, in particular by a preparation module, a data block having a block length;

determining, in particular by an authentication module, an available length, from at least the block length and a maximum length of a data frame, wherein the maximum length may be a pre-determined, pre-defined or given maximum length;

calculating from at least the data block, in particular subsequent to determining the available length, in particular by the authentication module, a message authentication code, MAC, having a MAC length not greater than the available length, and an additional MAC, having an additional MAC length not greater than the available length, wherein an authentication key may be used;

creating, in particular subsequent to calculating the MAC, in particular by a message generation module, the data frame, comprising, in particular in a pre-defined order or message format, the data block and the MAC; and creating, in particular subsequent to calculating the MAC and the additional MAC, in particular by the message generating module, an additional data frame, comprising, in particular in a pre-defined order or message format, the data block and the additional MAC. Herein, the MAC and the additional MAC may be different. The data frame may further comprise at least one data item, indicative of the block length and/or the MAC length; and the additional data frame may further comprise at least one data item, indicative of the block length and/or the additional MAC length.

A method of the first aspect of the invention may further comprise encrypting the data block or the compressed data block, in particular subsequent to compressing the data block and/or previous to calculating the MAC. This method element may be executed at the message source, the sender side, or the message generating side, in particular by an encryption module. An encryption key different from the authentication key may be used.

The method may further comprise transmitting or storing the data frame and/or transmitting or storing the additional data frame, in particular subsequent to generating the data frame, in particular at the message source, the sender side or the message generating side, in particular by a sending module or a storing module.

The MAC and/or the additional MAC may be calculated from at least the data block and at least one previously transmitted or stored data block wherein the at least one previously transmitted or stored data block may have been compressed and/or transmitted as part of a previously transmitted or stored data frame and/or a previously transmitted or stored additional data frame.

Additionally, the method may further comprise the following method elements which may be executed subsequent to transmitting the data frame and/or at a message retrieving side or at a receiver side:

receiving or retrieving the data frame and/or the additional data frame, in particular by a message receiving or retrieving module;

verifying the MAC and/or the additional MAC, in particular by a verification module, wherein verifying the MAC may comprise calculating a verification MAC from at least the data block and comparing the MAC with the verification MAC and wherein verifying the additional MAC may comprise calculating an additional verification MAC from at least the data block and comparing the additional MAC with the additional verification MAC.

The method may further comprise decompressing, in particular by a decompression module, the data block, in particular in case of positive verification of the MAC; and/or in case of encryption of the data block, decrypting, in particular by a decryption module, the data block, in particular previous to decompressing the data block and/or subsequent to verifying the MAC and/or the additional MAC.

The method may additionally comprise the following method elements which may be executed at the message retrieving side or the receiver side:

attributing, in particular by the verification module, a trust level to the data frame, the additional data frame, and/or the data block, in particular subsequent to verifying the MAC and/or the additional MAC; the trust level may be based at least on the verification of the MAC and/or the additional MAC, on the verification of a MAC/additional MAC of an at least one previously received or retrieved data frame and/or of an at least one previously received or retrieved additional data frame, on the MAC length, on the additional MAC length, on the MAC length of the at least one previously received or retrieved data frame, and/or on the additional MAC length of the at least one previously received or retrieved additional data frame, wherein the trust level may be higher in case of positive verification of the additional MAC and the MAC than in case of positive verification of the additional MAC or the MAC alone or than in case of no positive verification; and outputting, in particular by an output module, the data block, in particular the data block with the trust level, to a user and/or an application, in particular subsequent to decompressing and/or decrypting the data block, wherein the method may further comprise, in particular previous to outputting the data block, as a condition for outputting the data block, subsequent to outputting the data block, and/or as a condition for further processing of the data block, in particular by the application or the user, verifying, in particular by the verification module, the user, and/or the application, that the trust level is above a threshold of acceptance.

In embodiments, at least some or all of the method elements of a method according to the first aspect invention are executed by at least one integrated circuit.

A second aspect of the present invention relates to a computer program comprising instructions which, when the program is executed by a computer or a computer system, cause the computer or the computer system to carry out the method according to the first aspect invention as well as to a, in particular non-transitory, computer-readable data carrier having stored thereon the computer program.

A third aspect of the present invention relates to a device for sending or generating authenticated messages or data frames, which may be configured to execute the method of the first aspect of the invention, in particular the method elements which may be executed at message generating or sender side. In embodiments, the device may be adapted or configured to prepare a data block, in particular an uncompressed data block, having an uncompressed length or a block length, determine an available length from at least a compressed length or the block length and a maximum length of a data frame and to calculate a message authentication code, MAC, having a MAC length not greater than the available length, from at least the data block, in particular from at least a compressed data block, or from at least the data block and at least one previously transmitted or stored data block wherein the at least one previously transmitted data block may be transmitted or stored as part of a previously transmitted or stored data frame, and create the data frame, comprising, in particular in a pre-determined or pre-defined order or message-format, the data block, in particular of the compressed length, or the compressed data block and the MAC, wherein the device is further configured to compress the data block such that the data block, in particular the compressed data block, has the compressed length smaller than the uncompressed length; and/or calculate an additional MAC length not greater than the available length, from at least the data block, in particular from at least the data block and at least one previously transmitted or stored data block wherein the at least one previously transmitted or stored data block may be transmitted or stored as part of a previously transmitted or stored data frame, and create an additional data frame, comprising, in particular in a pre-determined or pre-defined order or message-format, the data block and the additional MAC.

The data frame may further comprise at least one data item, indicative of the block/compressed length and/or the MAC length; and the additional data frame may further comprise at least one data item, indicative of the block/compressed length and/or the additional MAC length.

In embodiments, the device may be further configured to encrypt the data block.

In embodiments, the device may comprise at least one integrated circuit.

In embodiments, the device may further comprise a preparation module configured to prepare the data block having the uncompressed length or the block length;

an authentication module configured to determine the available length from at least the compressed length or the block length and the maximum length of a data frame and to calculate the MAC and/or the additional MAC from at least the data block; and a message generation module configured to create the data frame, comprising the data block and the MAC, and/or the additional data frame, comprising the data block and the additional MAC.

The device may further comprise a compression module configured to compress the data block such that the data block has the compressed length smaller than the uncompressed length.

The device may further comprise an encryption module configured to encrypt the data block.

A fourth aspect of the invention relates to a device for receiving or retrieving authenticated messages or data frames, which may be configured to execute the method of the first aspect of the invention, in particular the method elements which may be executed at the message retrieving or receiving side. In embodiments, the device may be adapted or configured to receive or retrieve a data frame, comprising, in particular in a pre-determined or predefined order or message format, a compressed data block or a data block and a Message Authentication Code, MAC, verify the MAC, in particular by calculating a verification MAC from at least the compressed data block or the data block and comparing the MAC with the verification MAC, wherein the device is further configured to decompress the compressed data block, and output the data block to a user and/or an application; and/or receive or retrieve an additional data frame, comprising the data block and an additional MAC, and verify the additional MAC, in particular by calculating an additional verification MAC from at least the compressed data block or the data block and comparing the additional MAC with the additional verification MAC. Herein, the MAC and the additional MAC may be different.

In embodiments, the device may further be configured to attribute a trust level to the data frame, to the additional data frame, and/or the data block, in particular the trust level being based at least on positive verification of the MAC, on positive verification of the additional MAC, on positive verification of a MAC of a previously received data frame and/or additional data frame, a length of the MAC and/or of the additional MAC, and/or a length of a MAC of a previously received or retrieved data frame and/or of a previously received or retrieved additional data frame; and verify that the trust level is above a threshold of acceptance.

In embodiments, the device may comprise at least one integrated circuit.

In embodiments, the device may further comprise a message receiving or retrieving module configured to receive or retrieve the data frame and/or the additional data frame;

a verification module configured to verify the MAC and/or the additional MAC and/or to attribute the trust level to the data frame, the additional data frame, and/or to the data block; and an output module configured to output the data block.

The device may further comprise a decompression module configured to decompress the compressed data block.

A fifth aspect of the invention relates to a system for authenticating messages. The system comprises a device for sending or generating authenticated messages, according to the third aspect of the present invention, and a device for receiving or retrieving authenticated messages, according to the fourth aspect of the present invention.

These and other aspects of the present invention will be apparent from and elucidated with reference to the embodiments described hereinafter.

BRIEF DESCRIPTION OF THE DRAWINGS

The subject-matter of the present invention will be explained in more detail in the following text with reference to exemplary embodiments which are illustrated in the attached drawings.

Figure 1:
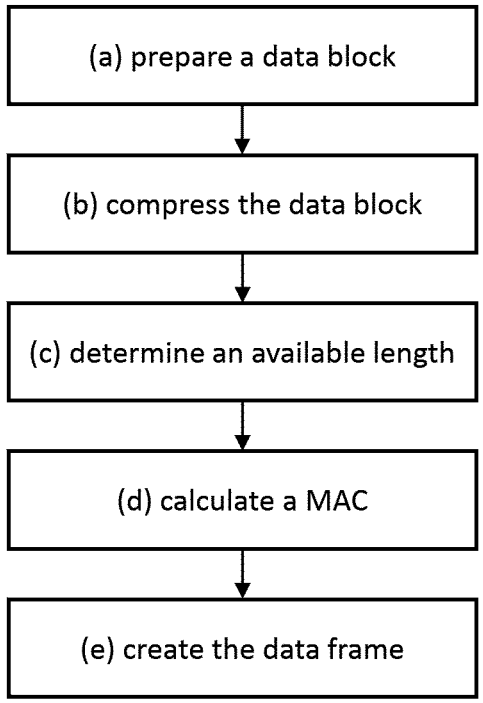
FIG. 1 schematically depicts a flow diagram of an embodiment of the first aspect of the present invention.

The reference symbols used in the drawings, and their meanings, are listed in summary form in the list of reference

DETAILED DESCRIPTION OF EXEMPLARY EMBODIMENTS

The present invention will be described in more detail with reference to the drawings, in which exemplary embodiments are shown.

In other words, the first aspect of the present invention can be described as a method for authenticating a data block in a data frame, comprising preparing the data block so that it has a block length, placing the data block in the data frame, allocating, in the data frame or in the data frame and in at least one additional data frame, an available space, having an available length for placing a Message Authentication Code, MAC, wherein preparing the data block comprises compressing the data block; and/or the available space is allocated in the data frame and in the at least one additional data frame and the method further comprises replicating the data block in the additional data frame. The method may further comprise calculating the MAC of the available length from at least the data block, placing the MAC in the data frame or in the data frame and in the additional data frame, encrypting the data block, in particular previous to calculating the MAC and/or subsequent to compressing the data block, and/or sending or storing the data frame and/or the additional data frame. In embodiments, the MAC may be calculated over at least the data block and at least one previously transmitted or stored data block. The method may further comprise receiving or retrieving the data frame and/or the additional data frame, and verifying the MAC or verifying at least parts of the MAC, in particular the part of the MAC placed in the data frame or the part of the MAC placed in the additional data frame. The method may further comprise decompressing the data block. In embodiments, the method may further comprise attributing a trust level to the data block, the data frame, and/or the additional frame wherein the trust level is based on the length of the verified MAC or of the verified parts of the MAC. In these alternative words, the MAC comprises the additional MAC; i.e., the additional MAC is the part of MAC that is placed in the additional data frame.

In the context of the present invention, a message may be a piece of information or data, e.g., comprised in a data block, which may be transmitted or stored by a sending or message generating side, in particular with the intention for consumption of the message by a recipient such as a message receiving or retrieving side. Further, a data frame according to the present invention may be a message frame. In the context of the present invention, a compressed length may be a compressed data block length and an uncompressed length may be an uncompressed data block length; a block length may be in particular a data block length.

The present invention proposes to use or create available capacity in a data frame or in an additional data frame to carry as much authentication information as possible. Accordingly, methods and devices according to aspects of the present invention are adaptive to an available spare capacity and the MAC length and the additional MAC length may vary. Such a spare capacity may be created or may be available, in particular by data compression of the information, the data, or the data block. Any data compression method is applicable, in particular methods for lossless compression, such as Huffman coding, run length coding, arithmetic coding, Lempel-Ziv coding, Lempel-Ziv-Welch, or Lempel-Ziv-Storer-Szymanski coding, or methods for lossy compression. Depending on the entropy of the data block and, in case of lossy compression, on the level of level of tolerable losses, the size of the compressed data and/or the compression ratio may vary. A further option to create or use spare capacity may be padding. Due to constraints of the message format and/or size granularities in number of bytes of words, a data frame may be filled up with dummy or padding bits. In the aspects of the present invention, padding or dummy bits may be used for at least parts of the MAC and/or the additional MAC. Often in communication and data storage, messages are transmitted or stored redundantly, e.g. in the case of GOOSE transmission in IEC61850. E.g., identical messages may be transmitted over disjoint paths to achieve seamless failover against network components as in the case of PRP or iPRP. In case of redundant message generation and/or transmission, the message retrieving or receiving side in prior art discards any redundantly retrieved or received message or data frame. In the present invention, a redundant message or data frame, i.e., an additional message or data frame comprising the same data block, may comprise an additional MAC, e.g., an additional part of the authentication information. In case the message retrieving or receiving side retrieves or receives more than one data frame comprising the data block, it has more authentication bits available and can increase a trust level of the data frame and/or the data block. Furthermore, also the calculation of a MAC of a data block or a frame may employ chaining of the data block to one or more previously transmitted or stored data blocks such that the message authentication of the previously transmitted or stored data blocks and of the data block increases the trust level for the data block as well as the previously transmitted or stored data block. Such a chaining may, e.g., be based on Cipher Block Chaining, CBC-MAC, or on Cipher Feedback MAC, CFB-MAC. In general, a trust level that may be attributed to an authenticated data frame, additional data frame, and/or data block can be used in the aspects of the present invention and may correspond to the number of bits available for authentication of the data frame or the data block.

The aspects of the present invention may further comprise means for error control of the data frame and/or the additional data frame. This can be achieved by the data frame and/or the additional data frame comprising a checksum or an integrity check value, which may be calculated at the message generating or sender side over other or all other elements of the data frame or the additional data frame, in particular such as the data block and/or the MAC/the additional MAC. At the message retrieving or receiving side, the checksum or the integrity check value may be checked and, in case, an error is found, the data frame or the additional data frame can be discarded.

Figure 2:
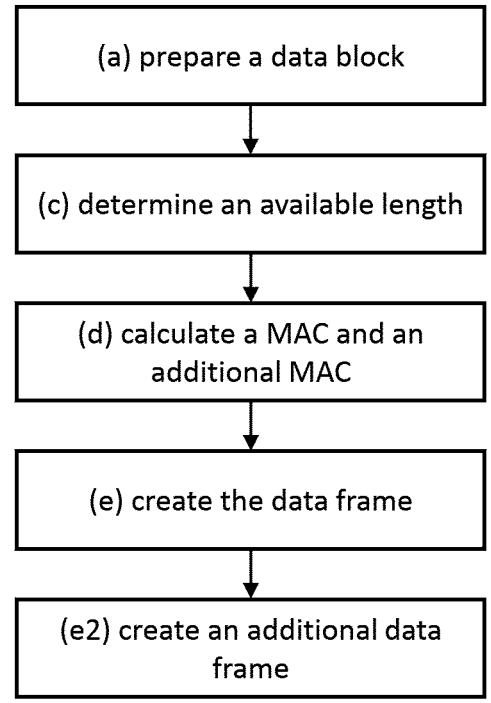
FIG. 2 schematically depicts a flow diagram of an embodiment of the first aspect of the present invention.
Figure 5:
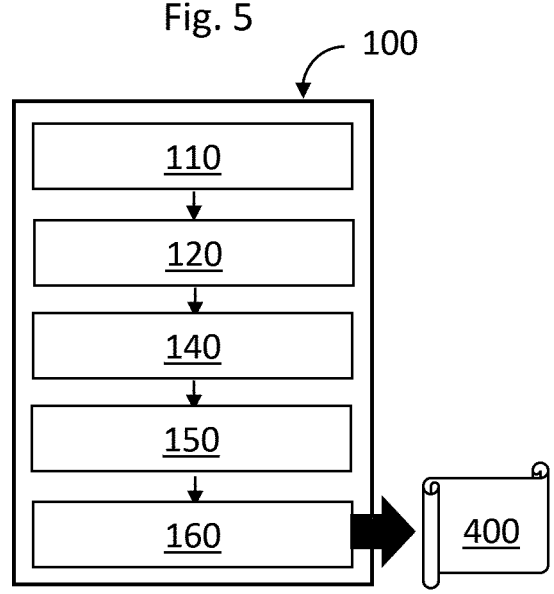
FIG. 5 schematically depicts an embodiment of the third aspect of the present invention.
Figure 7:
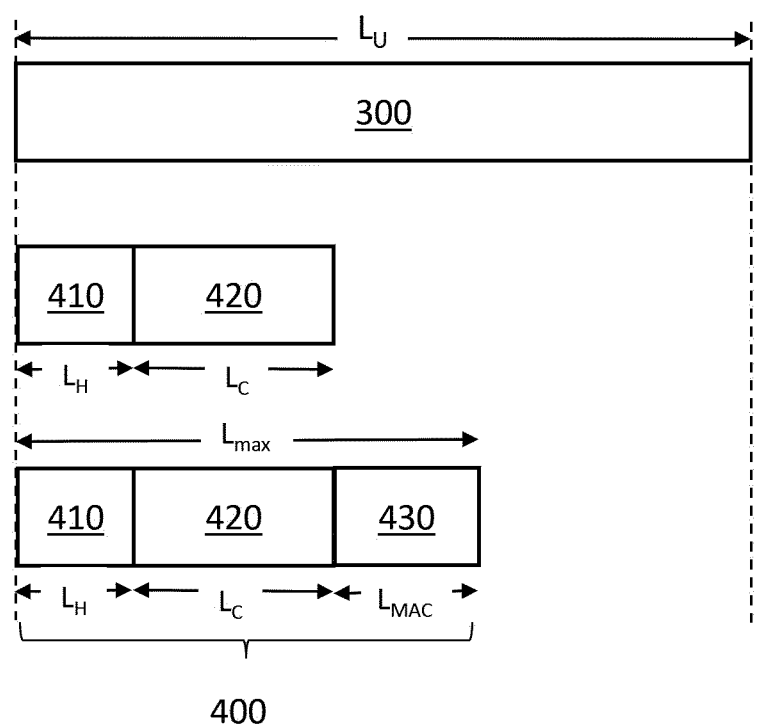
FIG. 7 schematically depicts, by way of example, data block, data frame header, data frame, and MAC according to aspects of the present invention.
Figure 9:
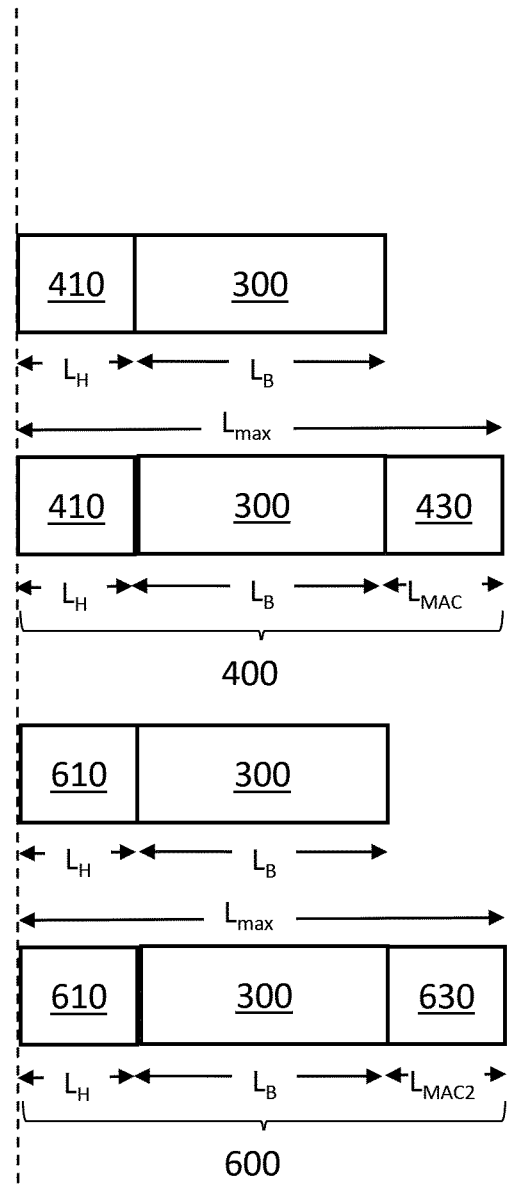
FIG. 9 schematically depicts, by way of example, data block, data frame headers, data frames, and MAC according to aspects of the present invention.

Exemplary embodiments of the method according to a first aspect of this method is depicted in FIG. 1 and FIG. 2 comprising method elements that may be executed at the sender or message generating side. For better understanding of the present invention, FIG. 7 and FIG. 9 schematically depict, by way of example, data blocks, data frame headers, data frames, and MAC. The method may be executed by a device 100 according to a third aspect of the present invention, of which an exemplary embodiment is illustrated in FIG. 5.

In method element a, a data block, in particular an uncompressed data block 300 may be prepared, e.g., by a preparation module 110. This data block may comprise information relevant for storage or transmission and has a certain entropy and an uncompressed length $L_U$ or a block length $L_B$; the uncompressed length $L_U$ or block length $L_B$ may be a pre-defined or fixed length corresponding to an amount of information to be included in the data frame.

Accordingly, method element b of compressing data block, in particular by a compression module 120, leads to the compressed data block 420 with compressed length $L_C$, typically shorter than the uncompressed length $L_U$. In case of too high entropy of the data block, the compression ratio may be one or close to one and the compression may not result in any reduction in length of the data block.

In case of message authentication of redundant messages, the method element b of compressing the data block 300, 420 is optional and the objectives of the present invention can be achieved by an embodiment of the method as schematically depicted in FIG. 2. If there is no compressing of the data block, the compressed length $L_C$ and the uncompressed length $L_U$ obviously coincide and can be used interchangeably and can be denoted as block length $L_B$.

In method element c, an available length $L_{avail}$ is determined from at least the compressed length $L_C$ or the block length $L_B$ and a maximum length $L_{max}$, in particular by an authentication module 140. This can be achieved, e.g., by subtracting the compressed length $L_C$ or block length $L_B$ and, possibly, a length $L_H$ of a data frame header 410 and of other message parts according to a message format, from the maximum length $L_{max}$ of a data frame 400. Depending on the uncompressed length $L_U$ or block length $L_B$, the entropy of the uncompressed data block 300, subsequently the compression ratio, and/or the compressed length $L_C$, the available length $L_{avail}$ may vary; e.g., in case of lower entropy of the uncompressed data block 300, there may be more bits available for the MAC 430 and the available length $L_{avail}$ may be larger.

In method element d of calculating a MAC, the MAC is calculated, in particular by the authentication module 140, from at least the data block 300, 420. This method element may further comprise calculating an additional MAC 630 from at least the data block, having an additional MAC length $L_{MAC2}$ not greater than the available length $L_{avail}$. In particular, a secret key as authentication key may be used; the same keys or different keys may be used for calculating the MAC and the additional MAC. To increase security, the authentication key may be regularly changed, i.e., re-keyed. This may be achieved by the message generating or sender side 100 providing appropriate key roll-over information to the message receiving or retrieving side 200. The calculation of the MAC and/or the additional MAC can be done by a cryptographic hash function. The input for this calculation can comprise the data block 300, 420 and, optionally, at least parts of the data frame header 410 or of the additional message header or other parts of the data frame or the additional data frame. The calculation can be done by a function such that it directly yields a MAC 430 of the MAC length $L_{MAC}$ and/or an additional MAC 630 of the additional MAC length $L_{MAC2}$; alternatively, an initial MAC is calculated that has a length larger than the MAC length $L_{MAC}$, then the MAC may be accordingly truncated. In case of redundant message generation or transmission, the truncated part of the initial MAC may be an additional MAC for an additional data frame. In more detail, in case n−1 additional data frames are to be generated, wherein n is an integer larger than 1, an initial MAC having a length of n times the MAC length $L_{MAC}$ may be calculated and, subsequently, the MAC and n−1 additional MACs may be generated by truncation. In this example, the additional MAC length $L_{MAC2}$ and the MAC length $L_{MAC}$ coincide; in other embodiments additional MAC length and MAC length could also vary, e.g., by one or more bits, for example, in case the MAC and one additional MAC are generated from an initial MAC of uneven length. In any case, the MAC and/or the additional MAC may not only be calculated from the data block 300, 420 and, optionally, the data frame header 410 or other parts of the data frame 400 alone, but may be also be additionally based on or calculated from at least one previously transmitted or stored data block. Then the methods mentioned above regarding chaining may be employed. The at least one previously transmitted or stored data block may itself also be compressed and/or may be transmitted or stored according to embodiments of the method of the first aspect of the present invention.

In method element e of creating the data frame 400, the data frame may be created by a message generation module 150, e.g., in a pre-defined order or message format. By way of example, such a message format is schematically depicted in FIG. 7, wherein by way of example the data block 420 is a compressed data block, and may comprise, firstly, the data frame header 410, secondly, the data block 420, and, thirdly, the MAC 430. The MAC length $L_{MAC}$ was determined from at least the compressed length $L_C$ or the block length and the maximum length $L_{max}$ such that the length of the data frame does not exceed the maximum length $L_{max}$. The header 410 may comprise at least one data item indicative of the compressed length $L_C$ or the block length and/or MAC length $L_{MAC}$. The at least one data item may comprise the compressed length $L_C$/the block length and/or the MAC length $L_{MAC}$, e.g., in terms of bits. From this data item and the length of the data frame and, the message order or format, which can be defined in the at least one data item or can be pre-defined, it can be derived which bits of the data frame comprise the data block 420 and which bits comprise the MAC 430. In case of redundant message authentication, in particular executed by the message generating module, the method may further comprise e2 creating an additional data frame 600, comprising the data block 300, 420, the additional MAC 630, and at least one data item indicative of the compressed length and/or of the additional MAC length 610. This additional data frame may comprise the data block 300 or the compressed data block, the additional MAC 630 and a header 610, as schematically depicted, by way of example, in FIG. 9. For example, the header of the additional message 610 may comprise the at least one data item indicative of the compressed length and/or of the additional MAC length. The additional data frame 600 may have a pre-defined order or message format, in particular the same as the data frame 400. In case of redundant message authentication, the data frame and the additional data frame may comprise a further data item that indicates which subsets of an initial MAC may have been used for the respective MAC or additional MAC. This facilitates verification of the MAC and/or the additional MAC.

Figure 4:
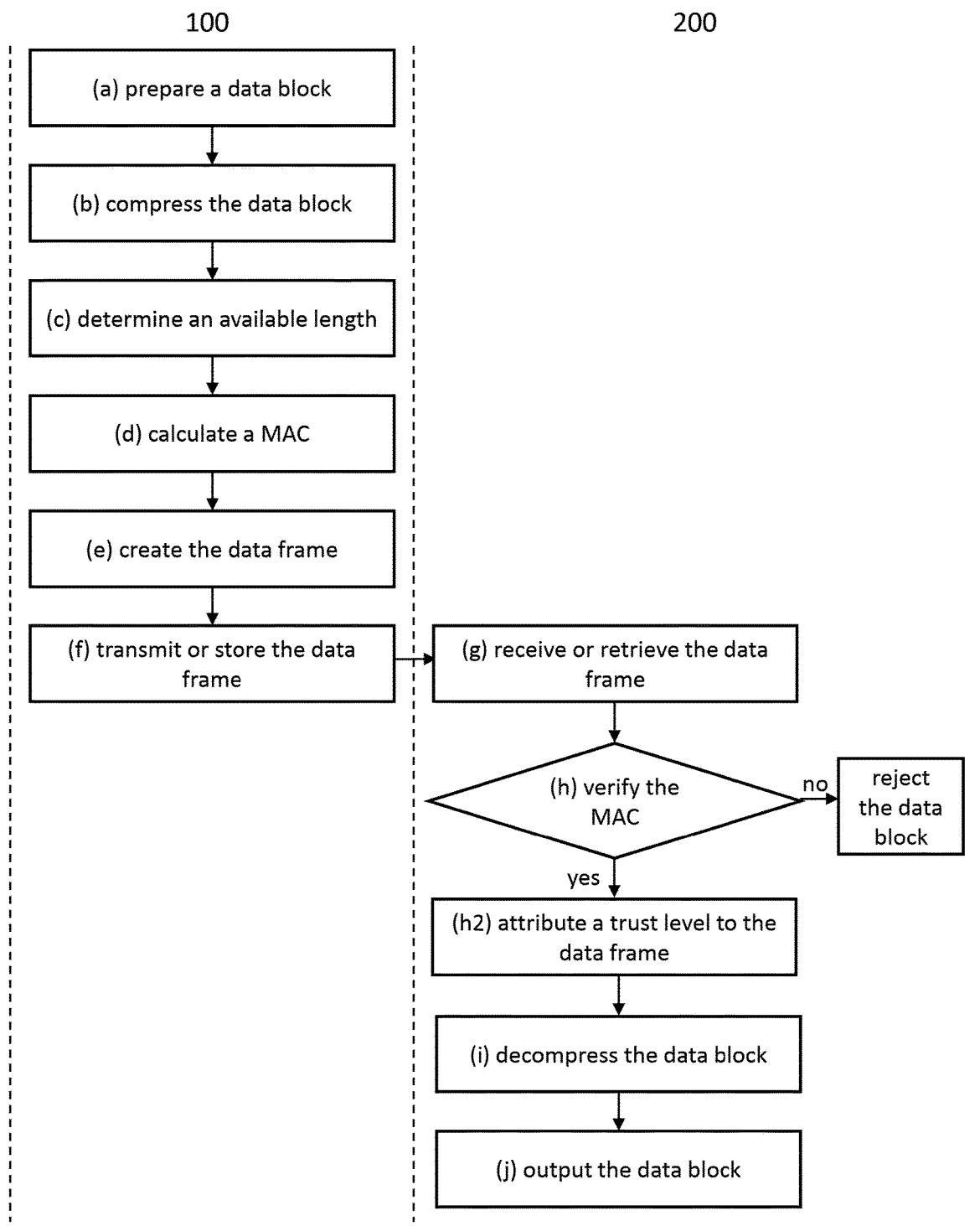
FIG. 4 schematically depicts a flow diagram of an embodiment of the first aspect of the present invention.
Figure 8:
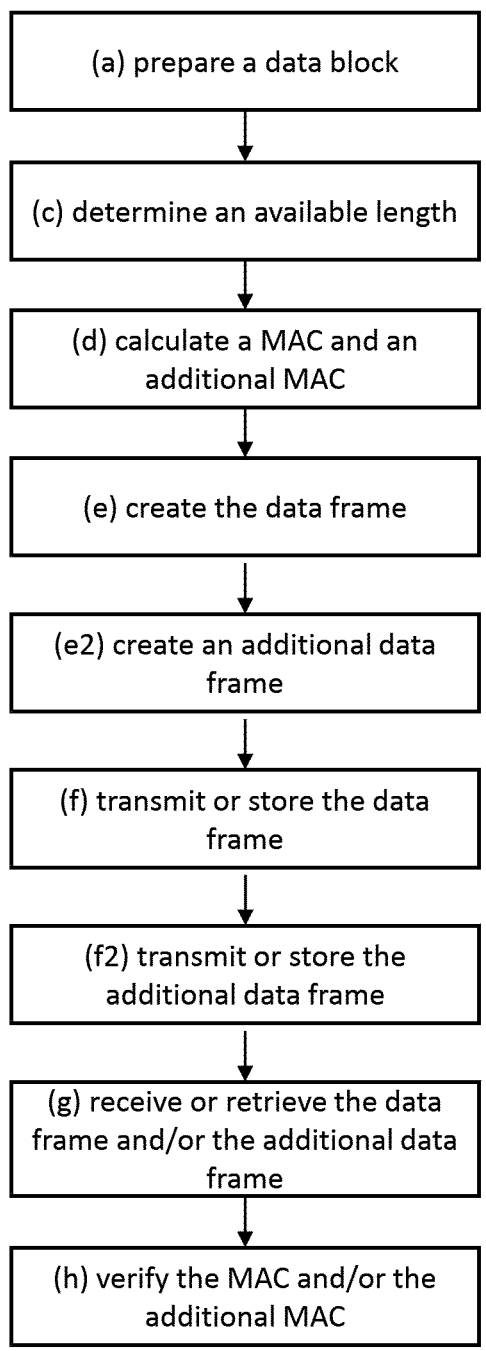
FIG. 8 schematically depicts a flow diagram of an embodiment of the first aspect of the present invention.

The method may comprise further method elements, e.g. schematically depicted in FIG. 4 and/or FIG. 8, that may be executed at the sender or message generating side 100, in particular in a device 100 according to the third aspect invention, which is, by way of example schematically depicted in FIG. 5:

A further method element b2 may be encrypting the data block 300, 420, in particular by an encryption module 130. Preferably, encryption may be done after optional compressing b of the data block 420 since encryption typically increases the entropy of the data block which results in a compression ratio of 1 or close to 1. For increased security, an encryption key different from the authentication key may be used. As in the case of the authentication key, the encryption key may be regularly re-keyed, wherein the message generating or sender side 100 may provide appropriate key roll-over information to the message receiving or retrieving side 200. The encryption may be executed before calculating the MAC and/or the additional MAC such that the MAC 430 and/or the additional MAC 630 are calculated over the encrypted data block 420; and the data frame 400 and/or the additional data frame can be authenticated before decryption; alternatively the data block 420 and further parts of the data frame 400 and/or the additional data frame 600 can be encrypted after calculation of the MAC 430 and/or the additional MAC 630; in such a case, decryption is required before message authentication. The data frame 400 may further be transmitted or stored. This method element f may be executed by a transmission or storage module 160 in the device 100. For storage, any storage means such as an internal memory in the device 100, a cloud storage, an external data or event recorder, or removable storage medium may be used. For transmission, a transmission channel 700, such as radio transmission, a short range wireless network, WIFI, Bluetooth, cellular transmission, NFC, a low power long range wide area network, a wired or fiber-optic communication link, and/or powerline communication, may be employed. Storage means or transmission channel 700 may be communicatively coupled to the transmission or storage module 160. A further method element f2 may be transmitting or storing the additional data frame 600, in particular by the transmitting or storing module 160. To this end, the same transmission channel 700 or the same storage means as for transmitting or storing the data frame 400 may be used. Alternatively, also a different transmission channel, such as a different channel of a wireless network, or different storage means may be used to achieve higher reliability. The transmitting or storing module 160 may also be communicatively coupled to this different transmission channel or storage means.

Figure 3:
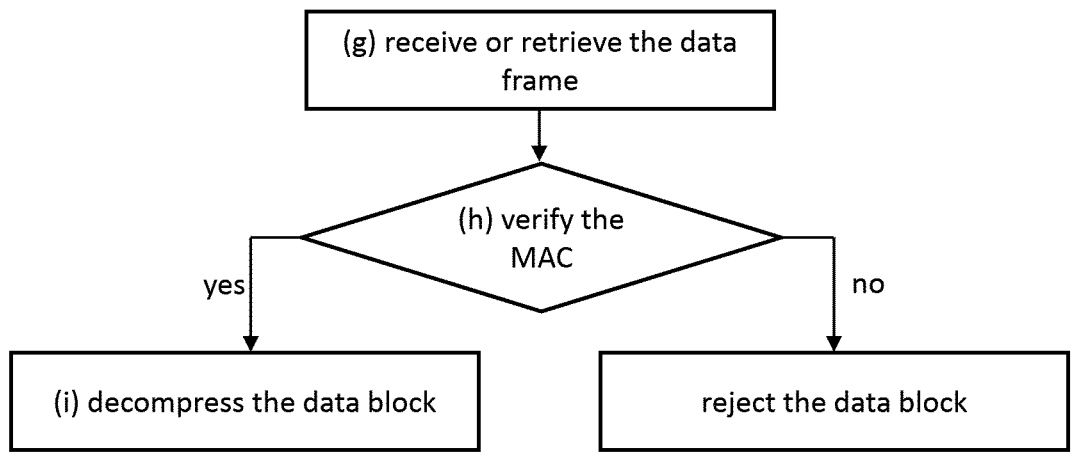
FIG. 3 schematically depicts a flow diagram of an embodiment of the first aspect of the present invention.
Figure 6:
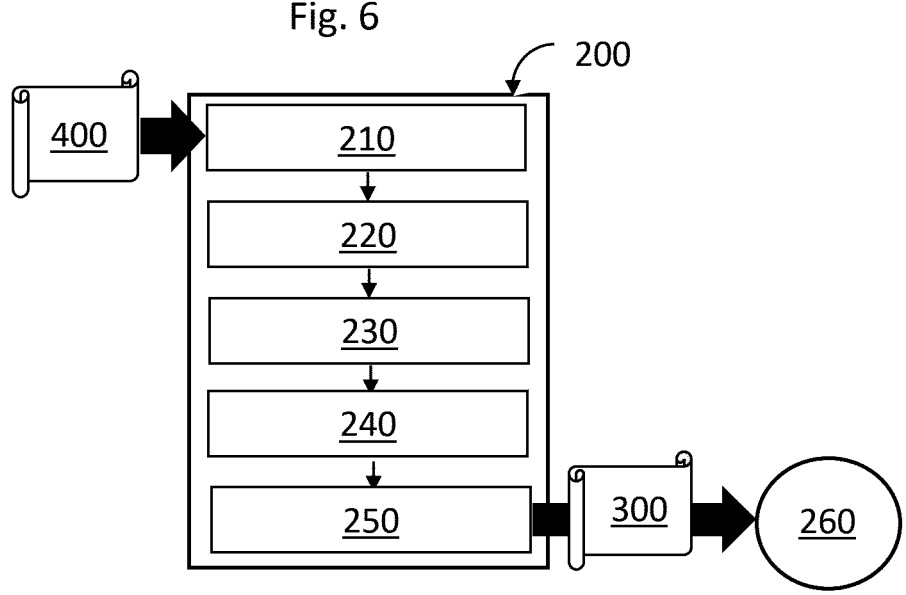
FIG. 6 schematically depicts an embodiment of the fourth aspect of the present invention.

Method elements carried out subsequently to transmitting or storing the data frame 400 may in particular be executed at a message receiving or retrieving side, in particular by a device 200 according to the fourth aspect of the present invention as, by way of example, schematically illustrated in FIG. 6. These method elements may be considered as part of embodiments of the first aspect of the present invention or may be considered as a further independent aspect of the present invention, in particular when carried out at a message receiving or retrieving side independently from the message generating or sender side. FIG. 3, FIG. 4, and FIG. 8 schematically illustrate embodiments of these method elements. The method element g of receiving or retrieving the data frame and/or the additional data frame may be carried out by a message retrieving module or receiving module 210 that may be communicatively coupled or adapted to be communicatively coupled to the transmission channel 700 or the storage means. Subsequently, in method element h of verifying the MAC and/or the additional MAC, the MAC 430 and/or the additional MAC is verified, in particular by a verification module 220. To this end, the MAC length $L_{MAC}$ and/or the additional MAC length may be determined from the data frame or from the additional data frame, respectively, e.g. from an at least one data item indicative of the block length/compressed length and/or the MAC length/additional MAC length; in particular, the MAC length $L_{MAC}$, the MAC 430, and the data block 300, 420 may be retrieved, from the data frame 400. Further, a verification MAC may be calculated from at least the data block 300, 420 using the authentication key and the same or a similar method as for calculating the MAC 430. Subsequently, the verification MAC is compared with the MAC. E.g., if a verification MAC having a length greater than the MAC length $L_{MAC}$ is calculated, only the first bits or another subset of the verification MAC, according to a truncation of an initial MAC during the MAC calculation, may be compared with the MAC 430. If the verification MAC or a subset of the verification MAC having the MAC length $L_{MAC}$ and the MAC 430 agree, the data frame is authenticated or verified. Verifying the additional MAC 630 may comprise calculating an additional verification MAC from at least the data block 420 and comparing the additional MAC with the additional verification MAC, similarly to the method element of verifying the MAC. In embodiments, the verification MAC and the additional verification MAC can coincide. In this case, the MAC and additional MAC are different subsets of an initial MAC; the data frame and/or the additional data frame may comprise a further data item or further data items to specify these subsets in more detail; alternatively, positive verification of the MAC and/or the additional MAC may be given, e.g., if the bit sequence of the MAC and/or the additional MAC can be found in the longer verification MAC.

A further method element i may be decompressing, in particular by a decompression module 240, the compressed data block 420. This may be done previous or subsequent to verifying the MAC. In the latter case, the compressed data block 420 may only be decompressed in case of positive verification of the MAC 430 or, alternatively, the compressed data block 420 may be decompressed in any case. In case of no positive verification of the MAC 430, the compressed data block 420 or the data frame 400 may be rejected as schematically depicted, by way of example, in the flow diagram of FIG. 3; this has the technical advantage that the required computing and/or storage resources at the message retrieving or receiving side 200 for decompression can be used for other tasks. If the data block 300, 420 and, possibly, other parts of the data frame 400 or the additional data frame have been encrypted at the message generating or sender side 100, the method may further comprise decrypting the data block 300, 420, in particular by an optional decryption module 230. As discussed further above, the compressed data block 420 is preferably encrypted after compression; decryption is executed previous to decompressing in this case. Decrypting may only be executed upon positive verification of the MAC 430 or the additional MAC to save computing and/or storage resources at the message retrieving or receiving side 200.

By way of example, FIG. 4 depicts a flow diagram of methods elements that may executed at the message generating or sender side 100 and the message retrieving or receiving side 200, respectively, which can according to the present invention also be executed independently from each other. A further method element may be attributing a trust level to the data frame 400, the additional data frame, and/or to the data block (300, 420), in particular by the verification module 220. Such a trust level may be based on the MAC length $L_{MAC}$, i.e., in case of positive verification of the MAC, the larger the MAC length, the higher trust level may be attributed to the data block 420 since the positive verification of the MAC has a higher confidence. In case of no positive verification of the MAC, the trust level may be set to zero or an indication that the information of the data frame 400 or the data block 300, 420 may not be trusted. In case the MAC 430 and/or the additional MAC is not only calculated from the data block, but, e.g., also from at least one previously transmitted or stored data block, the trust level may not only be based on positive verification of the MAC and/or the additional MAC and, optionally, on the MAC length and/or the additional MAC, but also on a positive verification of an at least one previously received or retrieved data frame and/or at least one previously received or retrieved additional data frame, in particular, comprising the at least one previously transmitted or stored data block, and, optionally, on the MAC length of this at least one data frame and/or additional data frame. E.g., for every data frame that has been positively verified in series, the trust level of the present data block 300, 420 and/or previous data blocks may be increased, e.g., by the number of additional bits used for verification, e.g., by the MAC length $L_{MAC}$ and the additional MAC length. The trust level may correspond or be based on the number of bits of MACs that have been positively verified in series. The trust level may be higher in case of positive verification of the additional MAC and of the MAC than in case of positive verification of the additional MAC or the MAC alone or than in case of no positive verification. In embodiments, the method elements of decompressing and decrypting may only be executed in case the trust level is above a threshold of acceptance. This additional step may also be executed by the verification module 220.

The method may further comprise the method element j of outputting the data block 300, 420, in particular, by an output module 250. The data block 420 may be output to a user or an application 260, in particular, only in case of positive verification of the MAC 430 and/or the additional MAC or in case the trust level is above a threshold of acceptance. The trust level may be output together with the data block 300, 420 such that the user or application can decide based on the trust level if and to which extent the information of the data block 300, 420 shall be processed further. E.g., below a certain trust level, the application/user may still use the data block for information purposes, but may not initiate certain actions based on the information of the data block; below another certain trust level, the data block may be completely discarded.

The third aspect of the present invention relates to a device for sending or generating authenticated messages 100, which is, by way of example, schematically depicted in FIG. 5. The fourth aspect of the present invention relates to a device for receiving or retrieving authenticated messages 200, which is, by way of example, schematically depicted in FIG. 6. These devices may comprise modules that are functionally coupled with each other to execute embodiments of the disclosed method for message authentication. In case of redundant message authentication, the device 100 does not require a compression module 120 and the device 200 does not require a decompression module 240; in these cases the preparation module 110 may be directly coupled to the encryption module or the authentication module 140 and the verification module 220 or the decryption module 240 may be directly coupled to the output module 250. Such devices can be a general purpose computer, an intelligent electronic device, TED, in particular, an TED for substation automation, and/or an IoT device, in particular, an IoT gateway. In embodiments, the device for sending or generating authenticated messages 100 may also be adapted to execute the method elements at the message retrieving or receiving side. In FIG. 6, it is illustrated that the user/application 260 may reside outside the device 200, e.g., in a further device, communicatively coupled to the device 200.

The user 260 can also be a human operator or user receiving the information of the data block 300 via a human-machine interface, HMI.

Figure 10:
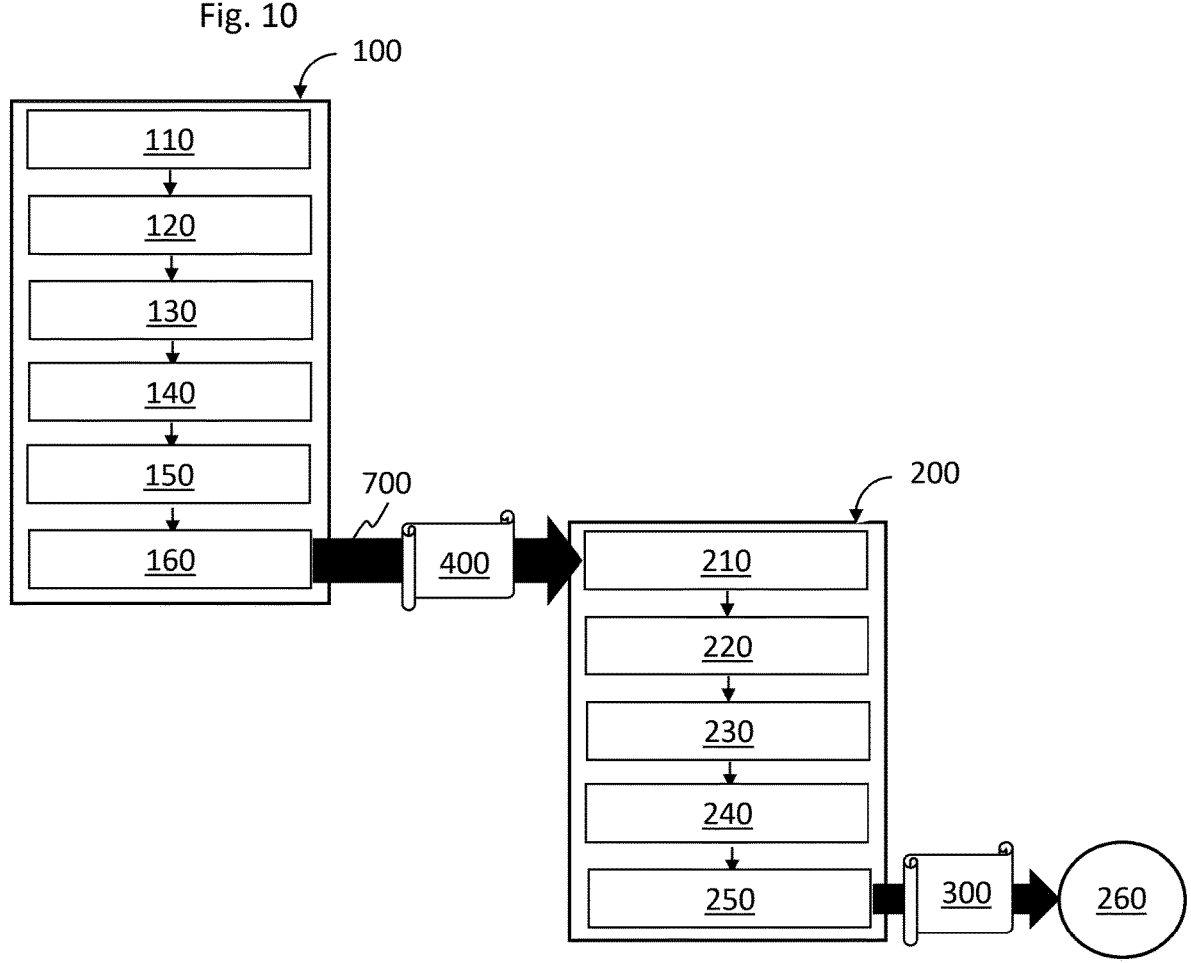
FIG. 10 schematically depicts an embodiment of the fifth aspect of the present invention.
Figure 11:
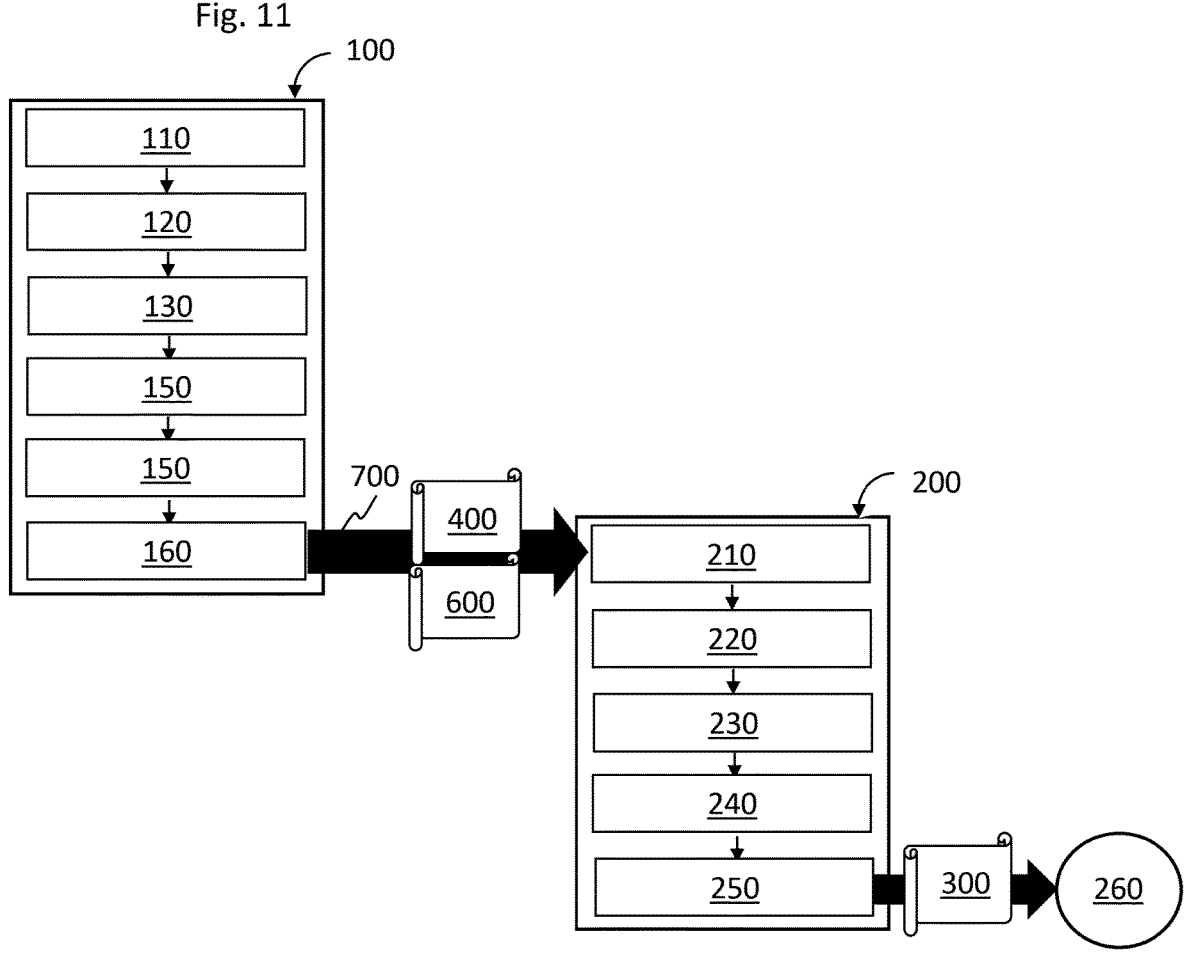
FIG. 11 schematically depicts an embodiment of the fifth aspect of the present invention.

FIGS. 10 and 11 schematically illustrate embodiments of the system for authenticating messages according to a fifth aspect of the present invention, comprising a device for sending or generating authenticated messages 100 and a device for receiving or retrieving authenticated messages 200, which may be communicatively with each other via a transmission channel 700 or via an access to common means for storage. FIG. 11 illustrates an embodiment with redundant message transmission wherein the data frame 400 and the additional data frame 600 are sent via the same transmission channel 700.

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

LIST OF REFERENCE SYMBOLS 100 message source, sender side, message generating side, device for sending or generating authenticated messages
110 preparation module
120 compression module
130 encryption module
140 authentication module
150 message generation module
160 transmitting or storing module
200 message retrieving side, receiver side, device for receiving or retrieving authenticated messages
210 message retrieving module, receiving module
220 verification module
230 decryption module
240 decompression module
250 output module
260 user, application
300 data block, uncompressed data block
420 data block, compressed data block
400 data frame
410 data frame header, data item indicative of the compressed length, the block length, and/or the MAC length
430 MAC
600 additional data frame
610 header of additional message, data item indicative of the block length, the compressed length and/or the additional MAC length
630 additional MAC
700 transmission channel
$L_B$ block length
$L_U$ uncompressed length
$L_C$ compressed length, length of the compressed data block
$L_{max}$ maximum length $L_{avail}$ available length
$L_{MAC}$ MAC length, length of the MAC
$L_{MAC2}$ additional MAC length, length of the additional MAC
$L_H$ data frame header length

The invention claimed is:

1. A method for message authentication, comprising preparing a data block having a block length;
   determining an available length based on the block length and a maximum length of a data frame;
   calculating a message authentication code (MAC) based on the data block, the MAC having a MAC length not greater than the available length;
   calculating an additional MAC based on the data block, the additional MAC having an additional MAC length not greater than the available length;
   creating the data frame that comprises the data block and the MAC; and
   creating an additional data frame that comprises the data block and the additional MAC.

2. The method of claim 1, further comprising encrypting the data block.

3. The method of claim 1, further comprising transmitting or storing the data frame and transmitting or storing the additional data frame.

4. The method of claim 3, wherein the MAC or the additional MAC is calculated based on the data block and a previously transmitted or stored data block.

5. The method of claim 3, further comprising:
   receiving or retrieving the data frame and the additional data frame; and
   verifying the MAC and the additional MAC.

6. The method of claim 5, further comprising attributing a trust level to the data frame and to the additional data frame.

7. The method of claim 6, further comprising verifying that the trust level is above a threshold of acceptance.

8. The method of claim 5, further comprising attributing a trust level to the data block and verifying that the trust level is above a threshold of acceptance.

9. The method of claim 1, wherein preparing the data block comprises:
   preparing the data block having an uncompressed length; and
   compressing the data block to obtain a compressed data block that has a compressed length that is smaller than the uncompressed length, the compressed length being the block length.

10. The method of claim 9, further comprising encrypting the data block.

11. The method of claim 9, further comprising transmitting or storing the data frame.

12. The method of claim 11, wherein the MAC is calculated based on the data block and a previously transmitted or stored data block.

13. The method of claim 11, further comprising receiving or retrieving the data frame and verifying the MAC.

14. The method of claim 13, further comprising attributing a trust level to the data frame and verifying that the trust level is above a threshold of acceptance.

15. The method of claim 13, further comprising attributing a trust level to the data block.

16. The method of claim 15, further comprising verifying that the trust level is above a threshold of acceptance.

17. The method of claim 9, further comprising:
   preparing a second data block having a second uncompressed length;
   compressing the second data block to obtain a second compressed data block that has a second compressed length that is smaller than the second uncompressed length;
   determining a second available length based on the second compressed length and the maximum length of a second data frame;
   calculating a second MAC based on the second data block, the second MAC having a second MAC length not greater than the second available length, wherein the second MAC length is different than the MAC length; and
   creating the second data frame comprising the second data block and the second MAC.

18. A non-transitory computer-readable data carrier having stored thereon a computer program comprising instructions which, when the computer program is executed by a computer or a computer system, cause the computer or the computer system to carry out the method of claim 1.

19. A non-transitory computer-readable data carrier having stored thereon a computer program comprising instructions which, when the computer program is executed by a computer or a computer system, cause the computer or the computer system to carry out the method of claim 9.

20. A device for generating authenticated messages, the device comprising:
   a non-transitory computer-readable memory storing instructions; and
   a computer processing device coupled to the memory and configured to execute the instructions to:
     prepare a data block having an uncompressed length or a block length;
     compress the data block such that the compressed data block has a compressed length smaller than the uncompressed length;
     determine an available length based on the compressed length and a maximum length of a data frame;
     calculate a message authentication code (MAC) based on the data block, the MAC having a MAC length not greater than the available length; and
     create the data frame, which comprises the data block and the MAC;
     calculate an additional MAC having an additional MAC length not greater than the available length; and
     create an additional data frame that comprises the data block and the additional MAC.

21. A system for authenticating messages comprising:
   the device according to claim 20; and
   a device for receiving authenticated messages, wherein the device for receiving authenticated messages is configured to:
     receive a data frame that comprises a data block and a received MAC;
     verify the received MAC;
     receive an additional data frame that comprises the data block and an additional received MAC; and
     verify the additional received MAC.

22. A device for receiving authenticated messages, the device comprises:
   a non-transitory computer-readable memory storing instructions; and
   a computer processing device coupled to the memory and configured to execute the instructions to:
     receive a data frame that comprises a data block and a Message Authentication Code (MAC);
     verify the MAC;

receive an additional data frame that comprises the same data block and an additional MAC; and verify the additional MAC.

\* \* \* \* \*